(12) United States Patent
Pferrer et al.

(10) Patent No.: US 8,632,623 B2
(45) Date of Patent: Jan. 21, 2014

(54) AEROGEL-BASED FILTRATION OF GAS PHASE SYSTEMS

(75) Inventors: Robert Pferrer, Scottsdale, AZ (US); Jose A. Quevedo, Brick, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 561 days.

(21) Appl. No.: 12/434,306

(22) Filed: May 1, 2009

(65) Prior Publication Data

US 2010/0071554 A1  Mar. 25, 2010

Related U.S. Application Data

(63) Continuation of application No. PCT/US2007/083177, filed on Oct. 31, 2007.

(60) Provisional application No. 60/863,866, filed on Nov. 1, 2006.

(51) Int. Cl.
*B01D 53/12* (2006.01)

(52) U.S. Cl.
USPC .......... 95/108; 95/275; 96/150; 55/474

(58) Field of Classification Search
USPC .......... 422/120, 139–149; 73/864–864.74, 73/273–287; 55/522–528, 474; 95/273–287, 107–113, 200, 230, 95/900–903; 420/120; 96/108–154, 96/290–300

See application file for complete search history.

(56) References Cited

U.S. PATENT DOCUMENTS

| | | | |
|---|---|---|---|
| 4,911,775 A * | 3/1990 | Kuma et al. | 156/208 |
| 5,360,572 A | 11/1994 | Hotaling et al. | |
| 5,470,612 A * | 11/1995 | Hotaling et al. | 427/377 |
| 5,786,059 A | 7/1998 | Frank et al. | |
| 5,789,075 A | 8/1998 | Frank et al. | |
| 6,101,886 A * | 8/2000 | Brenizer et al. | 73/863.23 |
| 6,447,991 B1 * | 9/2002 | Daitch et al. | 435/5 |
| 6,709,600 B2 | 3/2004 | Hrubesh et al. | |
| 6,860,924 B2 * | 3/2005 | Rajagopalan et al. | 96/154 |
| 6,887,563 B2 | 5/2005 | Frank et al. | |

(Continued)

FOREIGN PATENT DOCUMENTS

| | | |
|---|---|---|
| EP | 1452228 A1 | 9/2004 |
| WO | 2005/022667 A2 | 3/2005 |
| WO | 2006/119301 A2 | 11/2006 |
| WO | 2007047970 A2 | 4/2007 |

OTHER PUBLICATIONS

International Search Report and Written Opinion of the International Searching Authority mailed Mar. 3, 2008, from counterpart International Application PCT/US2007/083177, filed on Oct. 31, 2007.

(Continued)

*Primary Examiner* — Duane Smith
*Assistant Examiner* — Thomas McKenzie

(57) ABSTRACT

A purification method comprises directing a system having a gas phase component and a contaminant through a filter including an aerogel material, e.g., hydrophobic silica-based aerogel particles. A filter for purifying a gas phase system comprises an aerogel material in an amount sufficient to remove at least a portion of a contaminant present in the gas phase system. In preferred examples, the filter is a fluidized bed. In further examples, the filter is a packed bed.

16 Claims, 15 Drawing Sheets

(56) References Cited

U.S. PATENT DOCUMENTS

| | | | |
|---|---|---|---|
| 7,036,388 B1* | 5/2006 | Genovese et al. | 73/863.12 |
| 7,645,327 B2 | 1/2010 | Pfeffer et al. | |
| 2001/0034375 A1 | 10/2001 | Schwertfeger et al. | |
| 2002/0185444 A1* | 12/2002 | Coronado et al. | 210/693 |
| 2004/0139858 A1* | 7/2004 | Entezarian et al. | 95/275 |
| 2004/0168418 A1 | 9/2004 | Jha et al. | |
| 2005/0025276 A1* | 2/2005 | Hammes et al. | 375/376 |
| 2005/0026276 A1* | 2/2005 | Chou | 435/287.2 |
| 2005/0046086 A1 | 3/2005 | Lee et al. | |
| 2005/0061685 A1* | 3/2005 | Struthers et al. | 206/0.7 |
| 2005/0167891 A1 | 8/2005 | Lee et al. | |
| 2006/0052343 A1* | 3/2006 | Lahm et al. | 514/63 |
| 2006/0086834 A1 | 4/2006 | Pfeffer et al. | |
| 2006/0199455 A1* | 9/2006 | Stepanian et al. | 442/59 |
| 2007/0270502 A1* | 11/2007 | Edwards et al. | 514/769 |

OTHER PUBLICATIONS

International Preliminary Report on Patentability mailed May 14, 2009, from counterpart International Application PCT/US2007/083177, filed on Oct. 31, 2007.

* cited by examiner

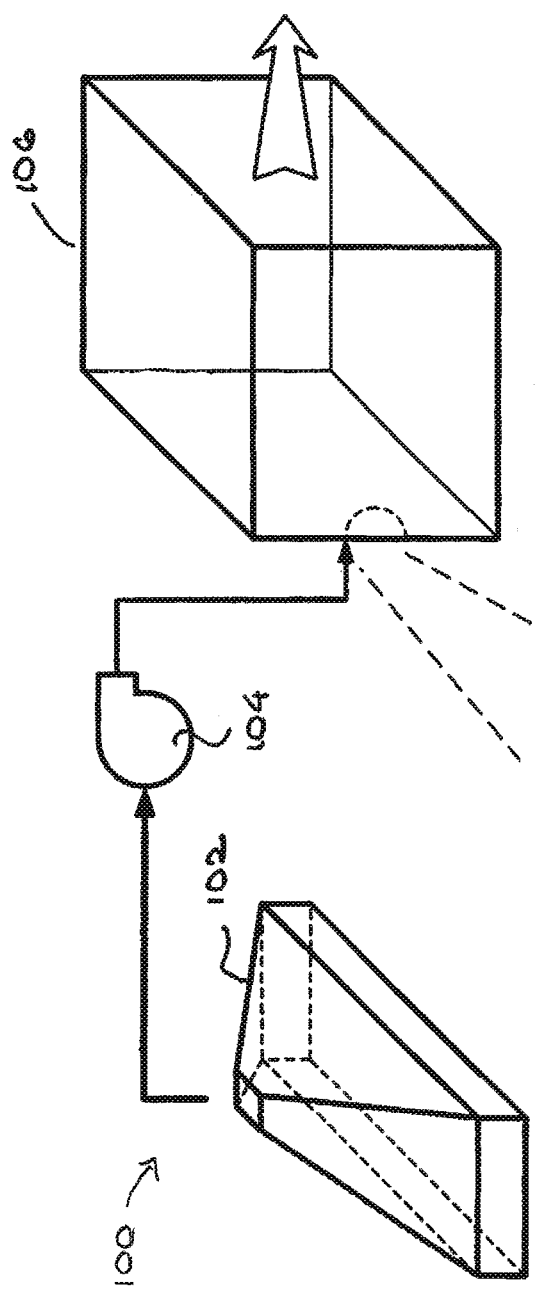
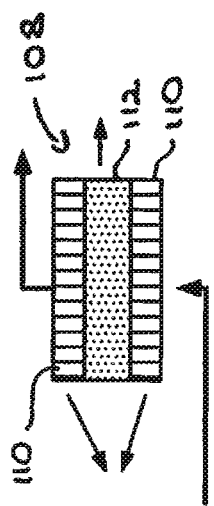

AEROGEL-BASED FILTRATION OF GAS PHASE SYSTEMS

RELATED APPLICATIONS

This application is a Continuation of International Application Number PCT/US2007/083177, filed on 31 Oct. 2007, designating the United States, which claims the benefit under 35 USC 119(e) of U.S. Provisional Application No. 60/863,866, filed on Nov. 1, 2006, both of which are incorporated herein by reference in their entirety.

GOVERNMENT SUPPORT

The invention was made with government support from the National Science Foundation under Government Grant/Contract No. NSF NER BES 0507936 awarded by the National Science Foundation. The government has certain rights in the invention.

BACKGROUND OF THE INVENTION

Air filters with particularly high collection efficiency are generally referred to as High Efficiency Particulate Air (HEPA) filters. HEPA filters are employed extensively in the microelectronics field, for example, in clean rooms and in the pharmaceutical industry. They are also used in hospitals, in food and cosmetic production facilities, as well as in residential settings, e.g., in air purifiers and vacuum cleaners.

HEPA filters are generally fiber-based and are made up of an entanglement of thin fibers that usually are less than one micron in diameter. With fiber-based materials, particles are collected by one or more classical mechanisms, such as diffusion, interception or inertial impaction. Two important performance-related parameters associated with these filters are pressure drop and collection efficiency. Collection efficiency (E) is related to penetration (P) by the formula: $P=1-E$. These performance-related parameters depend on several factors, such as: filter structure, e.g., packing density or fiber diameter; operating conditions, e.g., filter velocity, temperature; properties of the materials being filtered, e.g., density, mean particle size, particle size distribution, solid or liquid; or filter loading.

SEM studies indicate that in the case of solid particles filter loading of HEPA fiber filters initially takes place in the depth of the filter with the formation of chain-like agglomerates called dendrites. During the early stages of the filtration process, and at constant face velocity, the pressure drop across the filter generally rises linearly with the amount of mass or particles collected. However, as the dendrites begin to fill the spaces between the fibers, a filter cake of increasing thickness begins to form at the upstream surface of the filter and the slope of the pressure drop with increasing loading rises sharply, indicating that the filter is being clogged.

Shown in FIG. 1 is a schematic diagram of gas flow through a conventional HEPA filter, illustrating bulk region 3 and formation of cake 5 at the surface of filter 7 resulting in clogging of the filter. As solid particles deposit over the layer of fibers, the gaps are filled and the collection efficiency improves. However, the resistance of the filter increases, limiting the operative life of the filter. Thus "surface" or "cake" filtration has good collection efficiency, low capacity and is accompanied by a rapid increase in pressure drop as the surface gets clogged.

In the case of liquid particles or mists, particles are first deposited as droplets around the fibers and the pressure drop rises slowly with mass collected per unit of filter area. At a certain point during filtration, however, a sharp exponential rise in pressure drop is observed. This behavior generally is attributed to the presence of a liquid film covering the filter surface. It is believed that droplets deposited progressively grow and join together to form bridges at the intersection of several fibers. At the point of clogging, all, or substantially all, of the interstices of the first layer of fibers are filled, forming a film covering the filter surface. It is noted that clogging occurs at a much higher loading level for liquid particles, e.g., mists, than for solid particles.

Generally, particles that are the most difficult to filter are submicron in size and are referred to as particles having the "most penetrating particle size" or "MPPS". When clean, HEPA fiber-based filters provide excellent filtration efficiency and a low pressure drop for both solid and liquid MPPS particles and filtration occurs throughout the depth of the filter. This type of filtration generally is known as "deep bed filtration". However, as soon as the upstream surface becomes heavily clogged, filtration only occurs at the filter's surface, a phenomenon known as "cake filtration", leading to a sharp rise in pressure drop. Based on this sharp rise in pressure drop, filtration performance becomes unacceptable and the filter needs to be cleaned or replaced. In typical fiber-based HEPA filters, this degradation in performance occurs at a loading of about 1 to 10 g/m2 of filter area.

MPPS oil droplets tend to coalesce and penetrate voids in conventional HEPA filters. Since gas velocity through the filter increases due to clogging, oil that has saturated the voids of the fiber-based filter could be released in the form of liquid drops or as a liquid film downstream of the filter. Whereas, due to cake formation over the surface of the filter, collection efficiency of HEPA filter can actually increase when challenged with solid particles, the collection efficiency for oil droplets tends to decrease with time, due to a reduction in fiber surface available for capturing incoming droplets, as the fibers become coated with liquid.

Other techniques have been tried in the removal of oil droplets from air and they include demisters or woven metallic wire as means for collecting droplets by coalescence, electrostatic filters, centrifugal collectors and scrubbing. As with fiber-based HEPA filters these approaches do not appear to be very effective in handling submicron size droplets.

SUMMARY OF THE INVENTION

A need exists, therefore, for methods and devices effective in removing airborne contaminants from air streams or other systems. A need also exists for methods and devices capable of handling sub-micron size particles, e.g., MPPS. In particular, a need exists for the removal of airborne oil droplets and mists.

The invention generally relates to purification methods and devices.

In one embodiment, the invention is directed to a purification method comprising directing a system containing a gas phase component and a contaminant through a filter including an aerogel material, e.g., silica-based hydrophobic aerogel particles, thereby removing at least a portion of the contaminant.

In another embodiment, the invention is directed to a filter for purifying a gas phase system. The filter includes an aerogel material, e.g., aerogel particles, in an amount sufficient to remove at least a portion of a contaminant present in the gas phase system. In preferred examples, the filter is a fluidized bed. In further examples, the filter is a packed bed.

In still another embodiment, the invention is directed to a method for purifying a system. The method comprises directing a system containing a gas phase component and a contaminant through a filter which includes a nanoporous material, wherein the nanoporous material includes an oxide of a metal other than silicon.

In a further embodiment, the invention is directed to a filter for purifying a gas phase stream, the filter comprising nanoporous particles in an amount sufficient to remove at least a portion of a contaminant present in the gas phase system, wherein the nanoporous particles include an oxide of a metal other than silicon.

The invention has many advantages. Practicing the invention is particularly useful in removing submicron particles and/or oil droplets. In some embodiments, it can replace existing HEPA filters, providing reliable filtration with high efficiency, high capacity and low pressure drop. Filters of the invention are expected to perform as well or better than HEPA filters with respect to pressure drop.

Compared with conventional HEPA filters, the invention reduces or minimizes the need for cleaning and/or replacing the filter.

When customized as a packed bed, aerogel materials act as a "deep bed" filter rather than as a surface filter which tends to clog as soon as the surface becomes saturated with particles. Usually, the operating differential pressure drop of HEPA filters is between 1 to 8 inches of water, and the filters described herein can operate in this range.

Since the filtration capacity, which refers to the amount of aerosol particles captured by the filter media before cleaning and/or replacing is necessary, is larger for a packed bed aerogel filter than for a HEPA filter, the operational life of the aerogel filter generally is longer.

When used as a fluidized bed, the filter of the invention can be customized to run continuously. It also exhibits an extremely low pressure drop for both solid particles and liquid droplets, since in a fluidized bed the pressure drop plateaus when operating above the minimum fluidization velocity and is only equal to the weight of the particles per unit area of the bed. A fluidized bed of properly sized aerogels will remove submicron solid and liquid submicron particles (e.g., submicron oil droplets) at almost 100% efficiency depending on the initial bed height, i.e., the amount of aerogels used.

As with other granular filtration media, e.g., carbon black, aerogels may be lower in cost compared to HEPA polymeric-fiber based filters. While both carbon black and aerogel granules can withstand higher operating temperatures than polymeric fibers, aerogels can operate under temperatures higher than those generally possible with carbon black or HEPA filters. Furthermore, while both carbon black and aerogels can withstand corrosion as well or even better than HEPA, aerogels can capture oxidizing or oxidizable dust aerosols without the risk of fire.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6A is a schematic diagram of an arrangement for removing oil droplets from a hood.

FIG. 6B is a schematic diagram of a tray that can be employed in the arrangement shown in FIG. 6A.

FIG. 8B is a series of plots of collection efficiency for a HEPA filter challenged with solid PSLS.

DETAILED DESCRIPTION OF THE PREFERRED EMBODIMENTS

Figure 1:
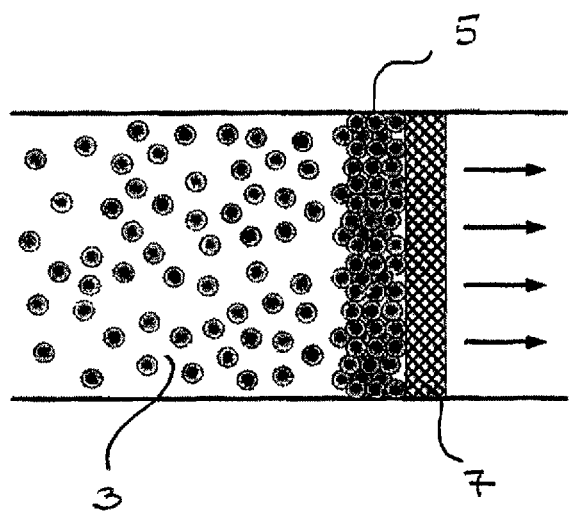
FIG. 1 is a schematic diagram of gas flow through a conventional (prior art) HEPA fiber-based filter.

The present invention generally relates to a purification method and device suitable for removing a contaminant from a system containing the contaminant.

Preferably, the system is a gas phase system, for instance a gas phase feed stream. Its purification can be conducted for health or safety reasons, to meet environmental or clean room operating standards such as hospital, public areas (airports, theaters, and so forth), electronic chip fabricators, vacuum cleaners, or for other reasons.

The gas phase system can include any gas phase component. Examples include but are not limited to gases and/or vapors such as, for instance, air, nitrogen, noble gases, e.g., argon, helium or xenon, carbon monoxide, carbon dioxide, silanes, gases and/or vapors present in gas phase streams used in industrial processes, e.g., streams employed in vapor deposition techniques, any mixture of gases, vapors, or both, and so forth.

The gas phase system also includes a contaminant. As used herein, the term "contaminant" refers to one or more undesired material, e.g., impurity, present in the system. The contaminant can be a solid, e.g., solid particles, or a liquid, in particular liquid droplets, e.g., a mist, or a mixture of both, for example in the form of aerosol. Liquid contaminants can have any viscosity such as generally encountered in gas phase systems subjected to purification. More than one type of contaminant can be present in the gas phase system.

The contaminant can have a particle size in the range of, for example, from about 0.001 micrometers (microns or μm) to about 10 microns. In some embodiments, the contaminant has a particle size, in the range of from about 0.05 to about 2 microns, preferably 1 micron or less. Larger particles can be filtered as well, such particles generally being easier to trap. As used herein, the term "particle size" refers to solid as well as to fluid, e.g., liquid, droplet size.

In preferred examples, contaminants have sub-micron particle size and are known as Most Penetrating Particle Size (MPPS) contaminants. In specific aspects of the invention, the contaminant is an aerosol. As used herein, the term "aerosol" refers to a suspension of airborne particles, whether liquid droplets or solids. In most cases aerosols are composed of particles of many different sizes and are referred to as "heterodisperse" or "polydisperse."

Generally, aerosols can be characterized by their aerodynamic properties which depend on properties such as density, geometric diameters and shape. Aerodynamic diameter, for example, is determined by the actual particle size, the particle density, and an aerodynamic shape factor.

Aerosols often are described in terms of the process giving rise to their formation. Dust, for example, is an aerosol formed by mechanical subdivision of a bulk material into airborne fines of the same chemical composition as the bulk. Dust particles are generally solid and irregular in shape and have diameters greater than 1 micron.

A fume is an aerosol of solid particles produced by condensation of vapors formed at elevated temperatures. The primary particles are generally very small, e.g., less than 0.1 micron, and have spherical or crystalline shapes. The primary particle can form aggregates or clusters, generally having a low overall density.

Condensation of combustion products can give rise to smoke, generally derived from carbon-based or organic materials. Smoke particles often are liquid droplets with diameters of less than 0.5 microns. Mist is a droplet aerosol formed by mechanical shearing of a bulk liquid, for example, by atomization, nebulization, bubbling, or spraying. The droplet size can cover a range usually from about 2 microns to greater than 50 microns.

Fog is an aqueous aerosol formed by condensation of water vapor on atmospheric nuclei at high relative humidities. Fog droplet sizes are generally greater than 1 micron. Smog is a popular term for a pollution aerosol derived from a combination of smoke and fog. The term is now commonly used for any atmospheric pollution mixture.

Specific examples of contaminants include solid impurities, e.g., dust, asbestos, liquid droplets such as mists, oil droplets, and/or droplets of other organic materials, e.g., biological materials, e.g., pollen, microorganisms, bacteria, viruses, blood or tissue fragments, mold, fungi, and so forth. More than one type of contaminant can be removed.

To remove a contaminant, e.g., aerosol, the system including the contaminant is contacted with a porous e.g., microporous or nanoporous, material. As used herein, the term "microporous" refers to materials having pores that are about 1 micron and larger; the term "nanoporous" refers to materials having pores that are smaller than about 1 micron, preferably less than about 0.1 microns. Pore size can be determined by methods known in the art, such as mercury intrusion porosimetry, or microscopy. Preferably the pores are interconnected giving rise to open type porosity.

The porous, e.g., nanoporous material can be an oxide of a metal, such as, for instance, silicon, aluminum, zirconium, titanium, hafnium, vanadium, yttrium and others, and/or mixtures thereof.

Materials that are particularly preferred include aerogels and/or xerogels.

Aerogels are low density porous solids that have a gas rather than a liquid as a dispersant. Generally, they are produced by removing pore liquid from a wet gel. However, the drying process can be complicated by capillary forces in the gel pores, which can give rise to gel shrinkage or densification. In one manufacturing approach, collapse of the three dimensional structure is essentially eliminated by using supercritical drying. A wet gel also can be dried using an ambient pressure, also referred to as non-supercritical drying process. When applied, for instance, to a silica-based wet gel, surface modification, e.g., end-capping, carried out prior to drying, prevents permanent shrinkage in the dried product. The gel can still shrinks during drying but springs back recovering its former porosity.

Product referred to as "xerogel" also is obtained from wet gels from which the liquid has been removed. The term often designates a dry gel compressed by capillary forces during drying, characterized by permanent changes and collapse of the solid network.

For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meter per gram (m$^2$/g) and higher, preferably from about 600 to about 1000 m$^2$/g), high porosity (about 90% and greater, preferably greater than about 95%), and a relatively large pore volume (about 3 milliliter per gram (mL/g), preferably about 3.5 mL/g and higher). Aerogels can have a nanoporous structure with pores smaller than 1 micron (μm). Often, aerogels have a mean pore diameter of about 20 nanometers (nm). The combination of these properties in an amorphous structure gives the lowest thermal conductivity values (e.g., 9 to 16 (mW)/m·K at a mean temperature of 37° C. and 1 atmosphere of pressure) for any coherent solid material. Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, or mixtures thereof can be utilized as well.

Also known are organic aerogels, e.g., resorcinol or melamine combined with formaldehyde, dendredic polymers, and so forth, and the invention also could be practiced using these materials.

Suitable aerogel materials and processes for their preparation are described, for example, in U.S. Patent Application No. 2001/0034375 A1 to Schwertfeger et al., published on Oct. 25, 2001, the teachings of which are incorporated herein by reference in their entirety.

In specific aspects of the invention, for instance in applications for capturing oil or other organic contaminants, the aerogel material employed is hydrophobic. As used herein, the terms "hydrophobic" and "hydrophobized" refer to partially as well as to completely hydrophobized aerogel. The hydrophobicity of a partially hydrophobized aerogel can be further increased. In completely hydrophobized aerogels, a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found in U.S. Pat. No. 6,709,600 B2 issued to Hrubesh et al. on Mar. 23, 2004, the teachings of which are incorporated herein by reference in their entirety.

Hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichlorosilane, mercaptopropylmethyldimethoxysilane, bis{3-(triethoxysilyl)propyl}tetrasulfide, hexamethyldisilazane and combinations thereof.

The porous material can include one or more additives, such as fibers, opacifiers, color pigments, dyes and mixtures thereof. For instance, a nanoporous material which is a silica aerogel can contain additives such fibers and/or one or more metals or compounds thereof. Specific examples include aluminum, tin, titanium, zirconium or other non-siliceous metals, and oxides thereof. Non-limiting examples of suitable opacifiers include carbon black, titanium dioxide, zirconium silicate, and mixtures thereof. While any appropriate loading of opacifier may be used, preferred loadings for the opacifier are between 1 vol. % and 50 vol. %).

The porous material can be produced in granular, pellet, bead, powder, or other particulate form and in any particle size suitable for an intended application. For instance, the particles can be within the range of from about 0.01 microns to about 10.0 millimeters (mm) and preferably have a mean particle size in the range of 0.3 to 3.0 mm.

Examples of commercially available hydrophobic aerogel materials in particulate form are those supplied under the tradename of Nanogel® by Cabot Corporation, Billerica, Mass. Nanogel® granules have high surface area, are greater than about 90% porous and are available in a particle size ranging, for instance, from about 8 microns (μm) to about 10 mm.

The material also can be produced in a monolithic shape, for instance as a rigid, semi-rigid, semi flexible or flexible structure, e.g., mat shaped composites that include fibers.

Composite materials can include fibers and aerogels (e.g., fiber-reinforced aerogels) and, optionally, at least one binder. The fibers can have any suitable structure. For example, the fibers can have no structure (e.g., unassociated fibers). The fibers can have a matrix structure or similar mat-like structure which can be patterned or irregular and random. Preferred composites of materials comprising fibers include composites formed from aerogels and fibers wherein the fibers have the form of a lofty fibrous structure, batting or a form resembling a steel wool pad. Examples of materials suitable for use in the preparation of the lofty fibrous structure include fiberglass, organic polymeric fibers, silica fibers, quartz fibers, organic resin-based fibers, carbon fibers, and the like. The material having a lofty fibrous structure can be used by itself or in combination with a second, open-cell material, e.g., an aerogel material. For instance, a blanket can have a silica aerogel dispersed within a material having a lofty fibrous structure.

Other composite materials include at least one aerogel and at least one syntactic foam. The aerogel can be coated to prevent intrusion of the polymer into the pores of the aerogel, as described, for instance in International Publication No. WO 2007047970, with the title Aerogel Based Composites, the teachings of which are incorporated herein by reference in their entirety.

In one specific example, the material is a cracked monolith such as described in U.S. Pat. No. 5,789,075, issued on Aug. 4, 1998 to Frank et al., the teachings of which are incorporated herein by reference in their entirety. Preferably, the cracks enclose aerogel fragments that are connected by fibers. Aerogel fragments can have an average volume of 0.001 mm$^3$ to 1 cm$^3$. In one composite, the aerogel fragments have an average volume of 0.1 mm$^3$ to 30 mm$^3$.

A further specific example utilizes a composite that includes aerogel material, a binder and at least one fiber material as described, for instance, in U.S. Pat. No. 6,887,563, issued on May 3, 2005 to Frank et al., the teachings of which are incorporated herein by reference in their entirety.

Other specific examples of materials that can be employed are fiber-web/aerogel composites that include bicomponent fibers are disclosed in U.S. Pat. No. 5,786,059 issued on Jul. 28, 1998 to Frank et al., the teachings of which are incorporated herein by reference in their entirety. Such composites use at least one layer of fiber web and aerogel particles, wherein the fiber web comprises at least one bicomponent fiber material, the bicomponent fiber material having lower and higher melting regions and the fibers of the web being bonded not only to the aerogel particles but also to each other by the lower melting regions of the fiber material.

In yet other specific examples the material is an aerogel sheet or blanket produced from wet gel structures, as described, for instance, in U.S. Patent Application Publication Nos. 2005/0046086 A1, published Mar. 3, 2005, and 2005/0167891 A1, published on Aug. 4, 2005, both to Lee et al., the teachings of which are incorporated herein by reference in their entirety.

Nanoporous materials other than aerogels also can be employed. In specific examples, the nanoporous material is an oxide of a metal, for instance a metal other than silicon. Specific examples include oxides of aluminum, zirconium, titanium, hathium, vanadium, yttrium and others, and/or mixtures thereof.

Combinations of materials, e.g., materials described above, in particulate and/or monolithic form, also can be employed. For instance, an aerogel can be combined with one or more materials such as those disclosed in U.S. patent application Ser. No. 11/416,034 entitled "Fractal Structured Nanoagglomerates as Filter Media", filed on May 2, 2006; and International Publication No. WO 2006/119301 A2, entitled "Fractal Structured Nanoagglomerates as Filter Media". The teachings of both are incorporated herein by reference in their entirety.

In other examples a nanoporous material, e.g., aerogel, is used in combination with conventional fibers used in HEPA filters.

The nanoporous material, e.g., aerogel, can be incorporated in a filtration device for example a module or cartridge that includes particulate or monolithic material. Filters of the invention can have a resistance or pressure drop in the range of 0.5 to 8 inches of water for applications in which the granular filter is used to replace HEPA filters. Filters of the invention can have other pressure drops depending, for instance, on the application and/or type of filter.

In one implementation, the device is a packed bed of dry aerogel granules. A suitable particle size for a packed bed using an aerogel collector is in the range of from about 150 to about 500 microns. A particularly preferred size is in the range of from about 150 to 250 microns. Larger or smaller aerogel particles also can be utilized depending on factors such as the thickness of the filter and/or the nature of the application.

Figure 2:
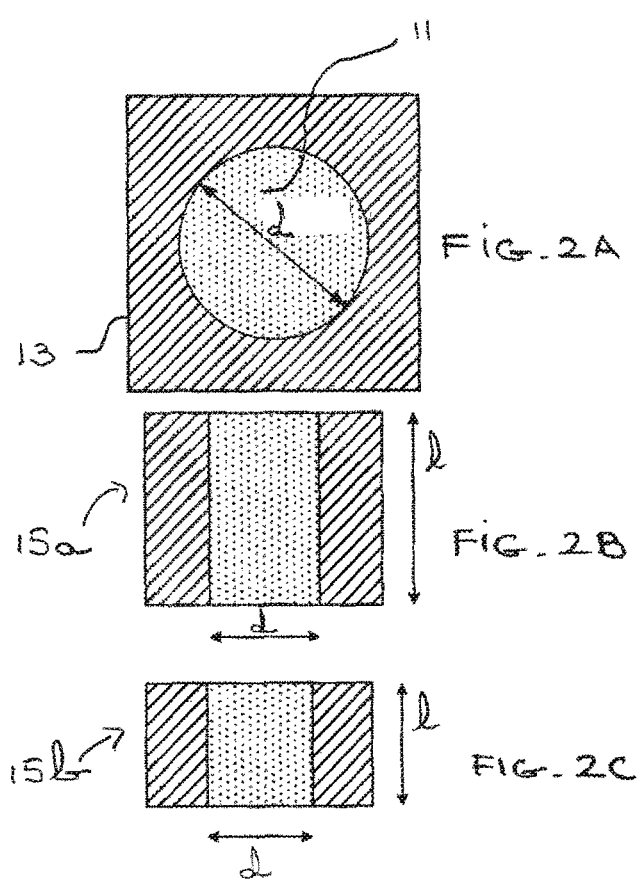
FIG. 2A is a top view of a bed packed with aerogel material.
FIG. 2B and FIG. 2C are cross sectional views of a bed without baffles packed with aerogel material.
Figure 3:
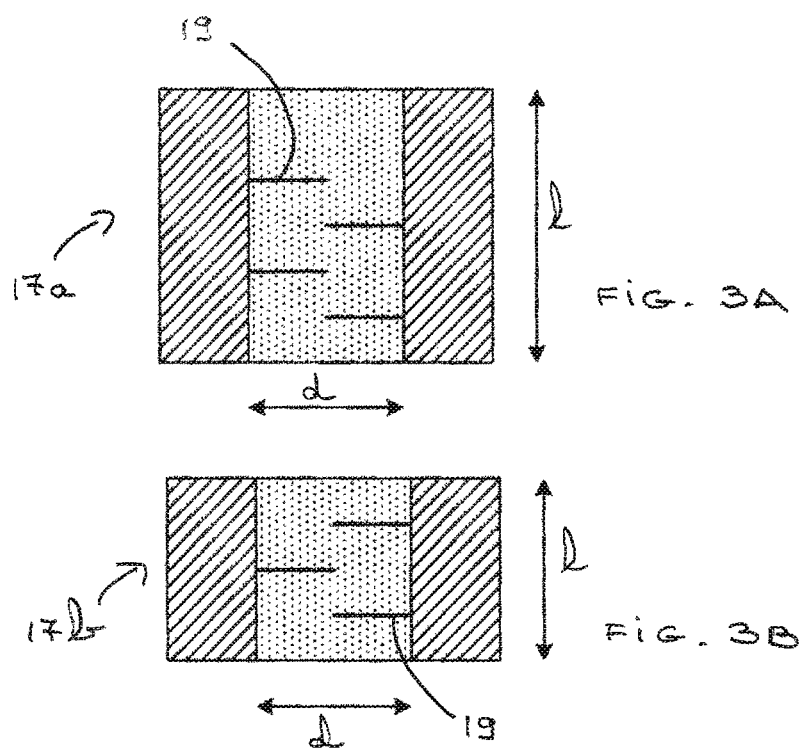
FIG. 3A and FIG. 3B are cross sectional views of a bed with baffles packed with aerogel material.

Shown in FIG. 2A is a front view of cylindrical cavity 11 held in a frame 13 which can be made of plastic, e.g., acrylic, or from another suitable material. FIG. 2B and FIG. 2C are sectional views of modules 15a and 15b without baffles, while FIG. 3A and FIG. 3B are views of modules 17a and 17b which are provided with one or more baffles 19. For experimental work, a suitable diameter, d, is 1.75 inches. The height or length, l, of modules 15a and 17a is 3 inches, while the height or length l of modules 15b and 17b is 2 inches. These dimensions can be scaled up or down, as needed for a particular application.

In experimental work, aerogel, or another nanoporous material, can be held inside the column by several, e.g., three, layers of polyester or another suitable fabric. The fabric is glued or otherwise attached to the top and bottom of the column. Meshes or other suitable means of containing aerogel particles within the cavity can be employed. Preferably, these means present no measurable collection efficiency when challenged by submicron particles.

Feed or input streams directed to a packed bed containing aerogel particles can have a temperature within the range of from about 100° C. to about 500° C., preferably from about 0° C. to 400° C.

Generally, feed pressure under which the packed bed filter operates can vary over a wide range depending on the application. Factors affecting feed pressure include supporting structure parameters, type of application and so forth. Preferably, the differential pressure drop across the packed bed is less than or equal to about 1 psi under extreme conditions. Most preferred are differential pressure drops that are much lower. In applications in which the filter of the invention is intended to replace HEPA filters, pressure drops can be in the range of from about 1 to about 8 inches of water.

In contrast to cake or surface filtration (FIG. 1), experiments indicate that aerogel devices such as those shown in FIG. 2A through FIG. 3B act via a "deep bed" mechanism, believed to be characterized by a collection efficiency which depends on depth, by increased capacity and by a slow rise in pressure drop, until the entire filter becomes clogged.

Figure 4:
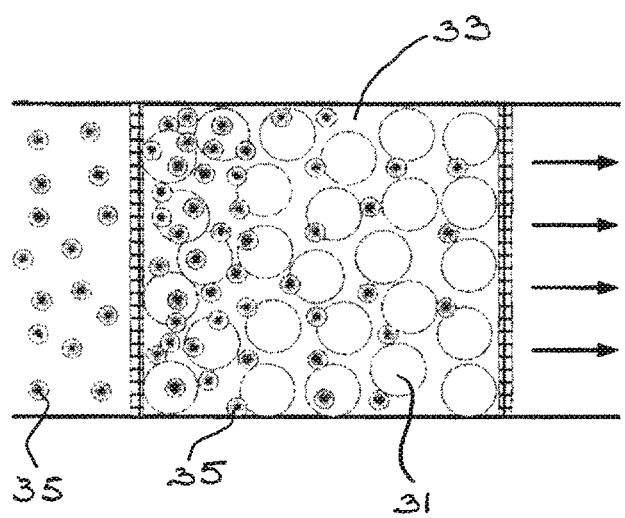
FIG. 4 is a schematic diagram of gas flow through a packed bed filter of the invention.

Filtration through a packed bed of aerogel particles is schematically illustrated in FIG. 4. As seen in FIG. 4, aerogel particles 31 in packed bed 33 function differently from conventional HEPA filters discussed above. Specifically, in contrast to the mechanism depicted in FIG. 1, contaminants, e.g., solid aerosol particles 35, deposit over different layers of aerogel particles 31, thereby filling up a volume rather than a surface. As a result, larger amounts of contaminants can be captured without significantly increasing the resistance of and/or pressure drop associated with the filter system.

Figure 5:
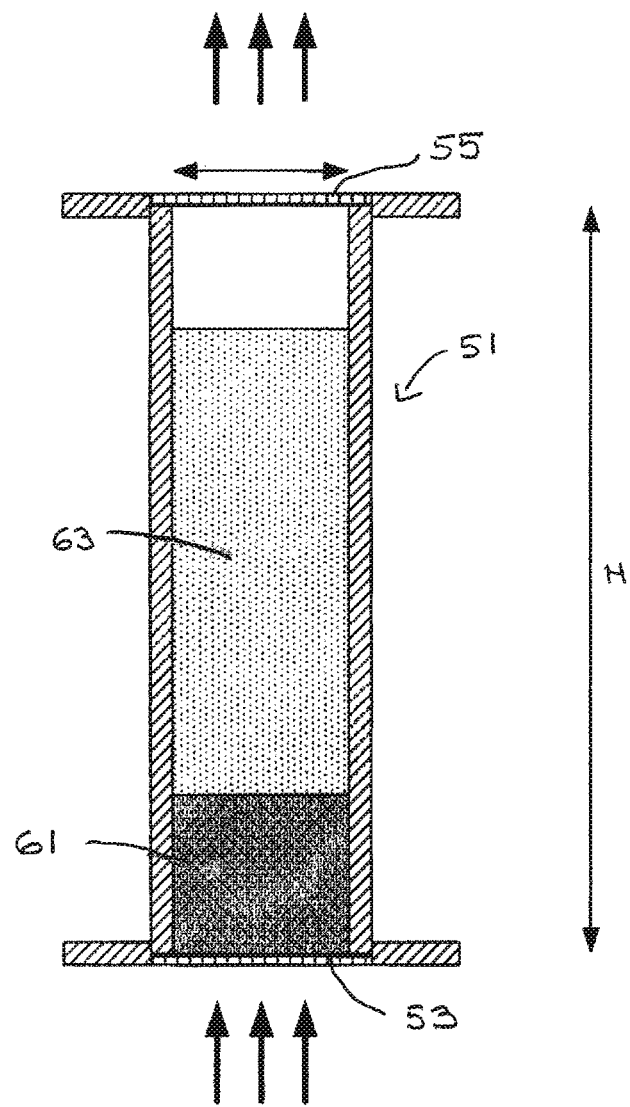
FIG. 5 is a cross sectional view of a fluidized bed using aerogel material.

In another embodiment of the invention, the material is provided in a fluidized bed, such as shown in FIG. 5. Shown in FIG. 5 is fluidized bed 51 which can be constructed from a plastic material, e.g., acrylic, metal, e.g., steel, aluminum, glass or other suitable materials. A transparent material, e.g., acrylic plastic or glass, allows visual inspection of the interior of bed 51 during operation.

Fluidization is conducted by means of the gas phase system being purified, as indicated by the three arrows at bottom of bed 51. Some examples of gases that can be present in the fluidizing gas phase system include air, nitrogen, helium, argon, oxygen, carbon dioxide, carbon monoxide, gases found in streams used in industry, e.g., vapor streams, and so forth.

The gas phase system is introduced to the fluidized bed through a porous distributor, e.g. metal mesh wire 53 at the bottom of bed 51, and cleaned gas is collected through metal wire mesh 55 at the top of the bed. Other types of devices can be used to feed and collect gas from the fluidized bed.

With no flow, particles in the bed occupy region 61 and reach an initial height typically less than the overall height H of the bed. A suitable initial level can be, for example, less than one half the bed height, H. With flow, the bed expands into region 63 as illustrated in FIG. 5.

For experimental work, height H can be in the range of from about 8 to about 12 inches. The dimensions of a fluidized bed such as bed 51 can be scaled up or down as dictated by a specific application.

The size of aerogel granules can be selected according to the application, in particular in instances in which aerogel particles are grinded from a bulk. For example, aerogel particles can have diameters in the range of from a few microns to 850 microns and more, e.g., up to 3 to 4 mm. Since collection efficiency may drop when using large size collectors, aerogel granules having diameters in the range of 65 to 150 microns are preferred. Also preferred is a sharp granule size distribution which can be achieved by sieving techniques, as known in the art. The final granule size would depend on the specific application in terms of collection efficiency, throughput (flow through the filter) and resistance (pressure drop).

Before fluidizing gas is directed to the bed, aerogel particles are settled at the bottom of the bed. To fluidize a fluidized bed having a height in the range of from about the 8 to about 12 inches, a suitable gas velocity is 0.7 centimeters/second (cm/s). Other gas velocities, e.g., 1.3 cm/s, can be employed. For aerogel granules of about 65 microns in diameter, a suitable minimum fluidization velocity is about 0.3 cm/s and a maximum suitable fluidization velocity is about 3 to 5 cm/s. The maximum operating velocity can depend on factors such as the fluidized bed height and the degree of collection efficiency desired. In many cases, the taller the bed, the better the collection efficiency and the larger the operating velocities.

A suitable fluidization apparatus is disclosed in U.S. Patent Application Publication No. 20060086834 A1, entitled "System and Method for Nanoparticle and Nanoagglomerate Fluidization", filed as application Ser. No. 10/900,868 on Jul. 27, 2004, the teachings of which are incorporated herein by reference in their entirety.

Using a fluidized bed filter, contaminant can be removed from gas phase systems at a temperature within the range of from about −30° C. to about 400° C. and preferably are operated at ambient temperature. Operating pressures generally depend on the application and the enclosing chamber. The differential pressure drop can also depend on the application, but in many cases it is not expected to exceed 1 psi.

The filters disclosed herein can be operated in batch mode or continuously. Fluidized beds for example, can be customized to run in a continuous mode.

More than one filtering device can be used. The devices can be the same type, e.g., two or more packed beds, or of different types and can include the same or different filtering media. Thus aerogel beds can be used in combination with filters containing fibers, nanoporous materials and/or agglomerates. For instance, a filtering device of the invention, e.g., a fluidized bed of aerogel particles, can be used together with one or more conventional HEPA filter. In specific examples, filters of the invention, employed to filter submicron particles, are positioned downstream of pre-filters, such as baghouses, cyclones or electrostatic precipitators, that remove large particles, e.g., larger than 1 micron.

The method and device disclosed herein can be practiced in many fields, industries and applications, including, for example, the microelectronics field, the medical device/pharmaceutical industries, health care applications, including hospitals, food and cosmetic production facilities, and residential settings, e.g., in air purifiers and vacuum cleaners. In many instances, the device and method disclosed herein can replace the use of conventional HEPA filters. The invention also can be practiced with organic contaminant in flue exhausts or in recycled streams in industrial facilities. Filters that include aerogel or other nanoporous materials can be incorporated in surgical or other respiratory masks.

The filters and method of the invention can be part of another, e.g., larger, apparatus or process.

In a specific example, the invention is practiced to remove oil droplets from exhaust vents in kitchens and restaurants. Shown in FIG. 6A, for instance, is apparatus 100 in which exhaust from hood 102 is directed by fan 104 or other means, e.g., pump, to filter assembly 106. Filter assembly 106 includes one or more filter modules or trays. An example of a suitable filter module, tray 108, is Shown FIG. 6B. Tray 108 has spacers 110 and contains aerogel material 112 and/or other nanoporous media or nanoagglomerates. A similar arrangement can be used to remove organic droplets from industrial or research laboratories.

Without wishing to be held to any specific interpretation or mechanism, it is believed that the high surface area of the materials disclosed herein favors collection by interception and that high hydrophobicity facilitates oil adsorption. Other factors believed to contribute are the high porosity, large pore volume and multimodal pore structure.

The invention is further illustrated by the following non-limiting examples.

EXAMPLES

Figure 7:
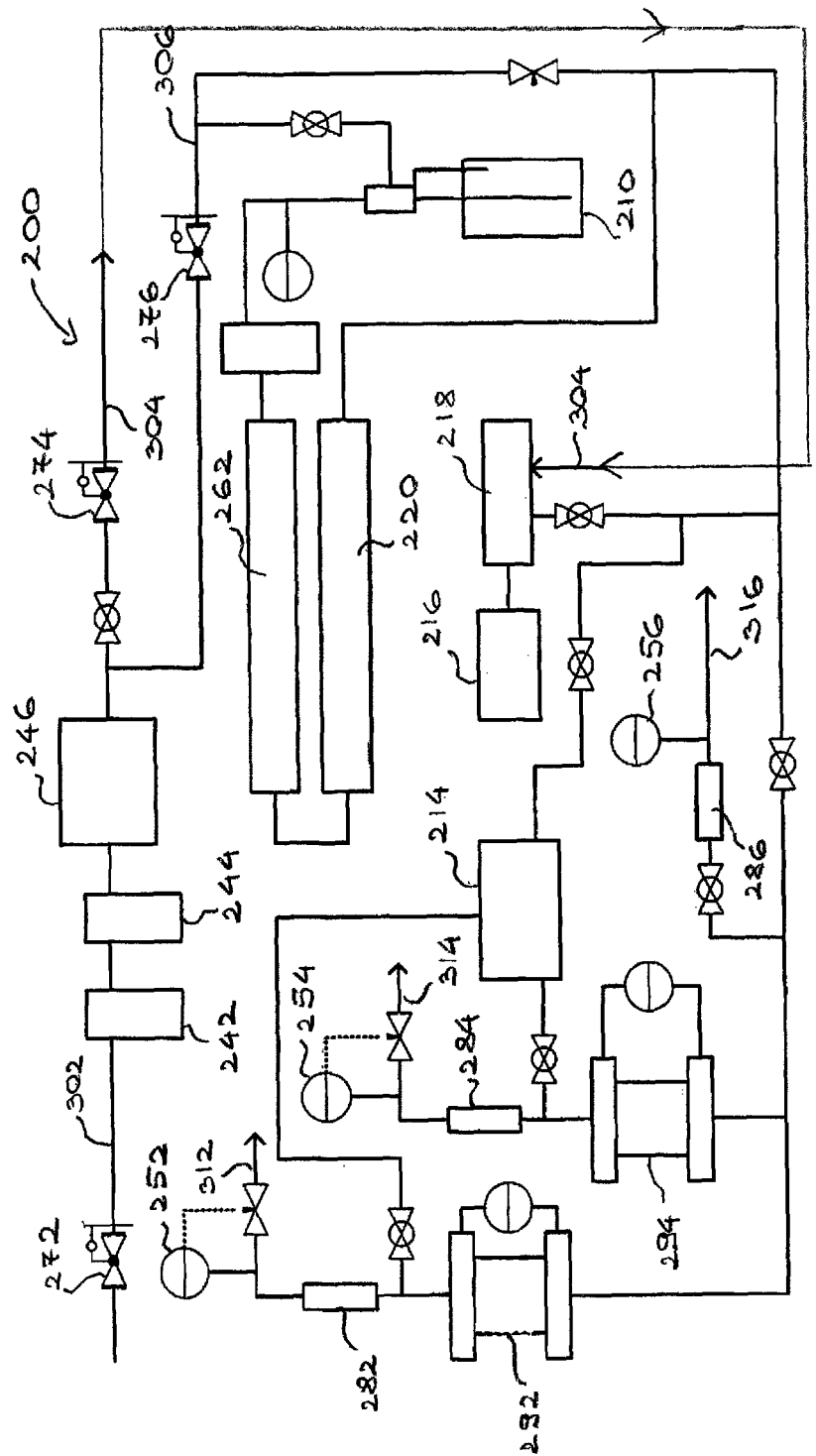
FIG. 7 is a schematic diagram of an arrangement that can be used to test filters of the invention.

Experiments described below were conducted using a set-up arrangement identical or similar to that shown in FIG. 7. Shown in FIG. 7 is apparatus 200, which included a clean air source, an aerosol generation system composed of atomizer 210 for the generation of submicron size droplets or the atomization of a suspension containing submicron solid particles such as polystyrene latex spheres (PSLS), drier 262 for removal of the solvent that contained the solid or liquid particles. Also included was particle counter system 214 located upstream of the filters. It included a Condensation Particle Counter (CPC) and a Scanning Mobility Particle Sizer (SMPS). A CPC 216 also was provided at diluter 218.

The atomizer was used to disperse solid polystyrene latex spheres (PSLS). A suitable Scanning Mobility Particle Sizer (SMPS) classified particles in the range of 15 to 800 nanometers, while Condensation Particle Counters (CPC) can count particles in the range of 0.015 microns to 2 microns.

An Aerosizer LD counted and classified particles in the range of 0.02 to 700 microns and was used in early experiments.

Apparatus 200 was adapted to neutralize any electrostatic charges that may be generated or encountered, using radioactive neutralizer 220. Instruments for measuring typical variables related to filtration, such as flow and pressure drop were provided.

For example, apparatus 200 included oil filer 242, dryer 244 and filter 246; flowmeters 252, 254, 256; dryer 262; pressure regulators 272, 274, 276; HEPA equipment 282, 284, 286; and filters 292 and 294.

Typical pressures employed were 100 psig in stream 302 and 80 psig in stream 304 which was directed to diluter 218. The pressure of stream 306 was about 10 psig. Particle counter system 214 and CPC 216 were connected to a vacuum pump to compensate for the pressure drop through the instruments and to control the sampling flow. Streams 312, 314 and 316 were vent streams.

Fluidized as well as packed beds were tested. A fluidized bed included Nanogel® granules held between two (top and bottom) stainless steel meshes with 20 micron orifices. When not fully fluidized, e.g., aerogel particles exhibiting spouting and channeling, oil droplets passing through a fluidized bed such as that shown in FIG. 5, gave rise to an aerosol size distribution. With full fluidization, no particles are sensed downstream of the filter.

A capacity test for a fluidized bed such as that shown in FIG. 5 and containing Nanogel®; 65 microns was run for 24 hours and resulted in a pressure drop increase from 1.168 to 1.92 inches (in.) of $H_2O$. When converted to weight, the increase in pressure drop was equivalent to a mass of 0.695 grams of oil absorbed by the fluidized bed, giving a capacity of 600 $g/m^2$ (mass of oil divided by the filter face area).

Further experiments indicated that, when not fully fluidized, or due to a sudden change in gas velocity, the bed can release small amounts of particles, reducing efficiencies to 99.988% at most. Increased pressure drop at high flow rates can induce cake formation due to elutriation into splash zone, and collection efficiency increases. Cake formation can be solved by stopping the flow, causing the cake of particles to fall.

Typical packed bed filters included a square acrylic plastic frame with a cylindrical cavity of thickness in the range of 1 to 3 inches and 4.45 cm in diameter. This frame was filled with particulate filter media. Specifically, three layers of a polyester filtering fabric (Rayon/Polyester, Snofil) of 6 mm thickness and a micron rating of 69, with a density of 0.7 oz/sq. yd. were arranged to hold the filter medium inside the module. The three layers were glued to each face of the module.

For comparison, a specific HEPA filter tested was HEPA Shopvac™.

An aerosol stream was fed through the filter media contained within the frame. The number of particles in the aerosol streams, before and after the filter, was measured either using an Aerosizer (Amherst/TSI Instruments) or the CPCs and the SMPS systems. These data were used to calculate collection efficiency. Measurements of the pressure drop with respect to time were used to compare the filtration capacity of our filters against a HEPA filter. The Aerosizer was only used in early experiments before the 2 CPCs (upstream and downstream) and the MPPS were incorporated into the experimental setup shown in FIG. 7.

Experimental procedures included preparing a solution for atomization. The solution contained oil or polystyrene latex spheres (PSLS). As needed, instruments were turned on, warmed up and/or calibrated. Pressure drop across the filter was measured for several gas stream velocities. Blank runs were conducted using clean gas, e.g., air through the filter to verify that particles were not released from the filter medium.

Flow through the customized filter was set to be equal to the flow in the HEPA filter and atomization of the solution containing oil or PSLP was begun. Flows were measured with mass flow transmitters. Differential pressure drops across the filters were measured with differential pressure transmitters. All transmitters were connected to displays that allowed recording of the data in a personal computer. Due to increases in the pressure drop across the filter media during aerosol filtration, the flow rate passing through the filter media would normally decrease. Conditions were adjusted to maintain the flow rate at a constant level. In particular, the venting valve upstream of the filters was partially closed for raising the pressure upstream of the filters, thereby keeping/maintaining the airflow through the filters at a constant level; also the mass flow transmitters were coupled with needle control valves for accurate adjustment of the flows.

All experiments were done using a HEPA filter and the aerogel test filter simultaneously (in parallel, as seen in FIG. 7). Measurement of aerosol particles was as follows. The number of particles upstream of the filter was constantly counted with Diluter and CPC 3760A. SMPS analyzed aerosol upstream the filters. SMPS analyzed aerosol downstream of HEPA filter. SMPS analyzed aerosol downstream of filter tested, e.g., filter containing aerogel. After each measurement, the SMPS system was cleaned so that accurate particle counting was ensured.

At least three measurements were performed by changing the flow through the filters. Capacity runs were carried out after obtaining collection efficiencies.

Parameters used to describe filter performance include throughput or the face gas velocity measured in centimeters/second (cm/s); resistance or pressure drop in $H_2O$; penetration (P) which is the ratio of the downstream concentration to the upstream concentration, with percent penetration (% P) being defined as 100×P; efficiency (E) defined as E=1−P.

With respect to capacity, filters are described in term of surface filter expressed as mass (grams or g) collected per area in units of $g/cm^2$; deep-bed filter expressed as mass collected per volume in units of $g/cm^3$ and by the rate by which the resistance of the filter increases with respect to time. For testing the capacity of the filters, the customized filters and a HEPA filter were challenged simultaneously against the same aerosol. The pressure drops across both filters were also monitored for comparison. The filter with the higher rate of increase in pressure drop with respect to time has the smaller capacity.

Industry standards developed to evaluate filters include those of the American Society of Heating, Refrigerating and Air-Conditioning Engineers (ASHRAE). ASHRAE Standard 52.1 was developed to evaluate low, medium and high efficiency filters, up to but nor including HEPA filters. HEPA filters can be evaluated by the DOP (Dioctyl Phthalate) efficiency test. ASHRAE 52.2 provides a procedure for measuring filter efficiency by particle size. Filter ratings according to ASHRAE 52.2 are in terms of minimum efficiency reporting values (MERV).

HEPA filters can be rated using DIN (German standard) e.g., DIN 24183, and/or EN (European Normalization), e.g., EN 1822, standards. Filter class for existing HEPA SHOP-VAC™ having a collection efficiency of 99.95 is EU13 or H13 by the DIN and EN standards, respectively. A HEPA Capsule by Pall CORP., having a collection efficiency of 99.995 is classified, respectively, as EU14 and H14 by DIN and EN standards.

Several filters were evaluated using the general procedures discussed above with a set-up such as that shown in FIG. 7.

Comparative Example

Figure 8A:
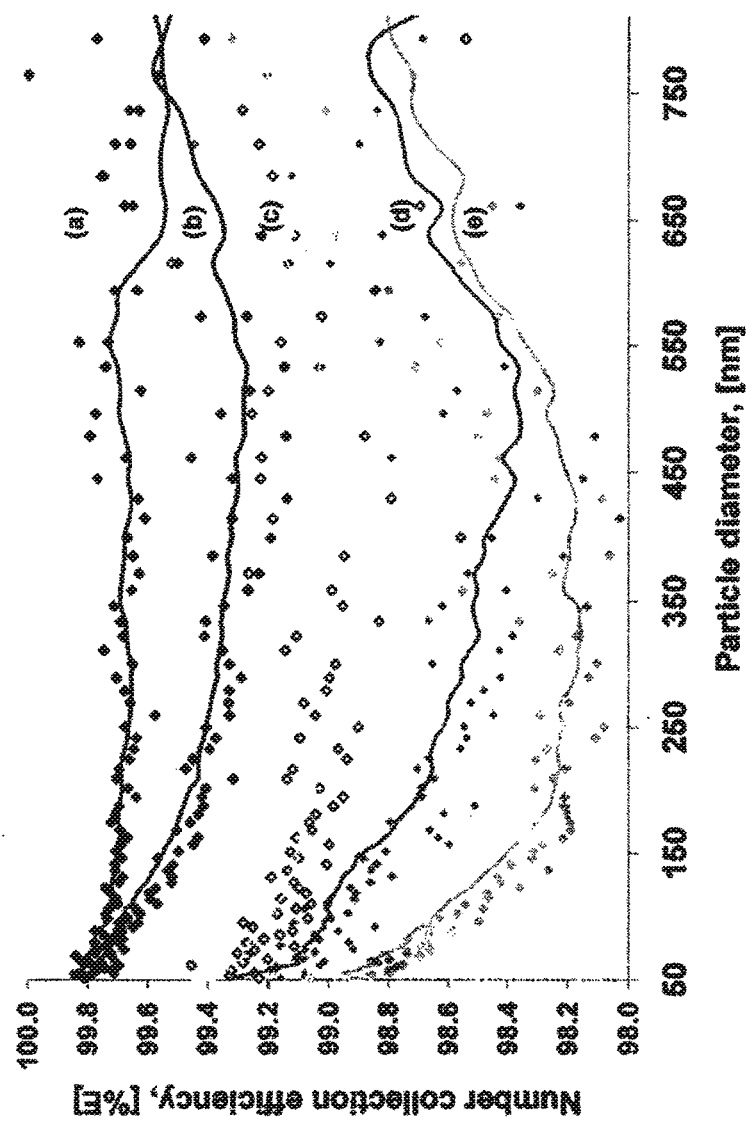
FIG. 8A is a series of plots of collection efficiency for a HEPA filter challenged with oil droplets.
Figure 8A:
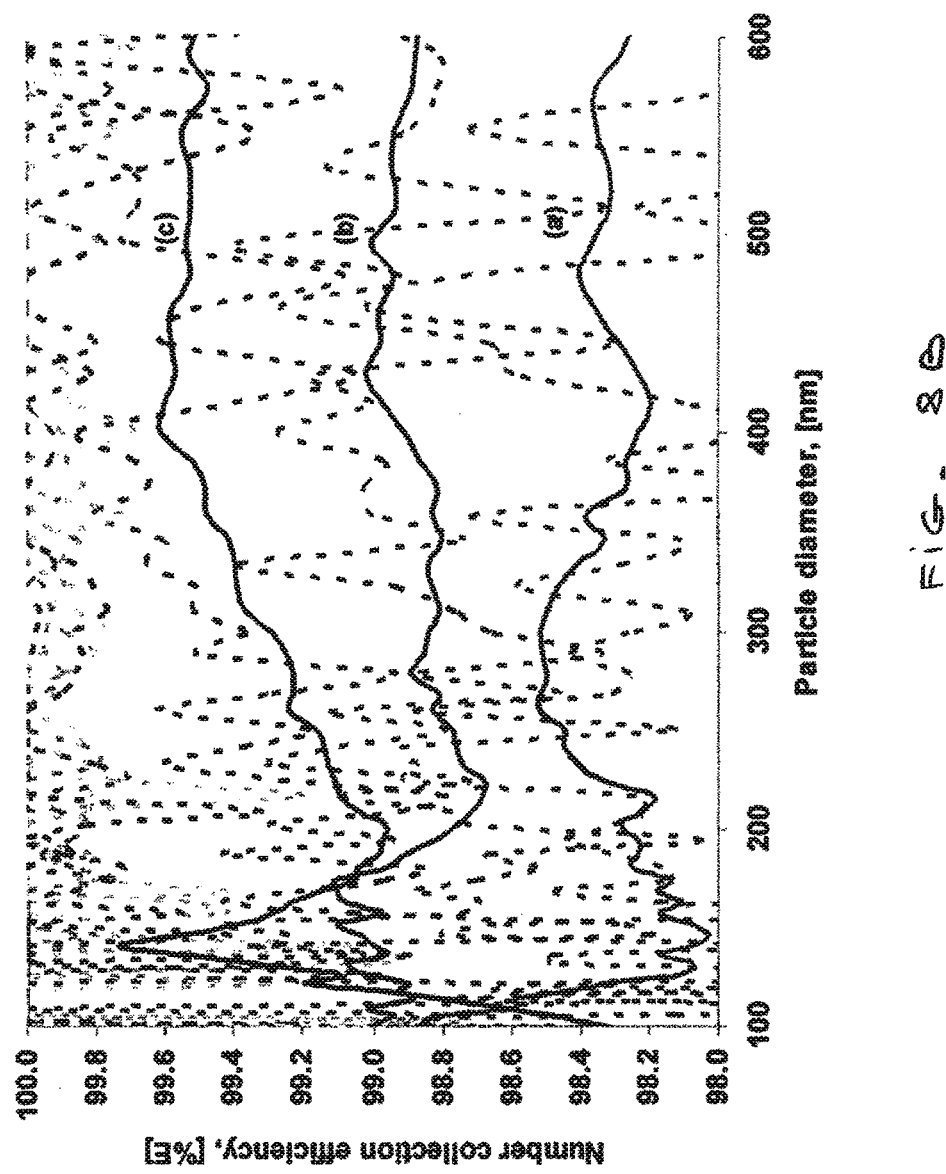

Shown in FIG. 8A are number collection efficiencies plotted as a function of oil droplet particle size for a conventional HEPA filter, specifically Shopvac™. Shown in FIG. 8B are number collection efficiencies plotted as a function of solid (PSLS) aerosol particle size for the Shopvac™ filter.

Example 1

Figure 9A:
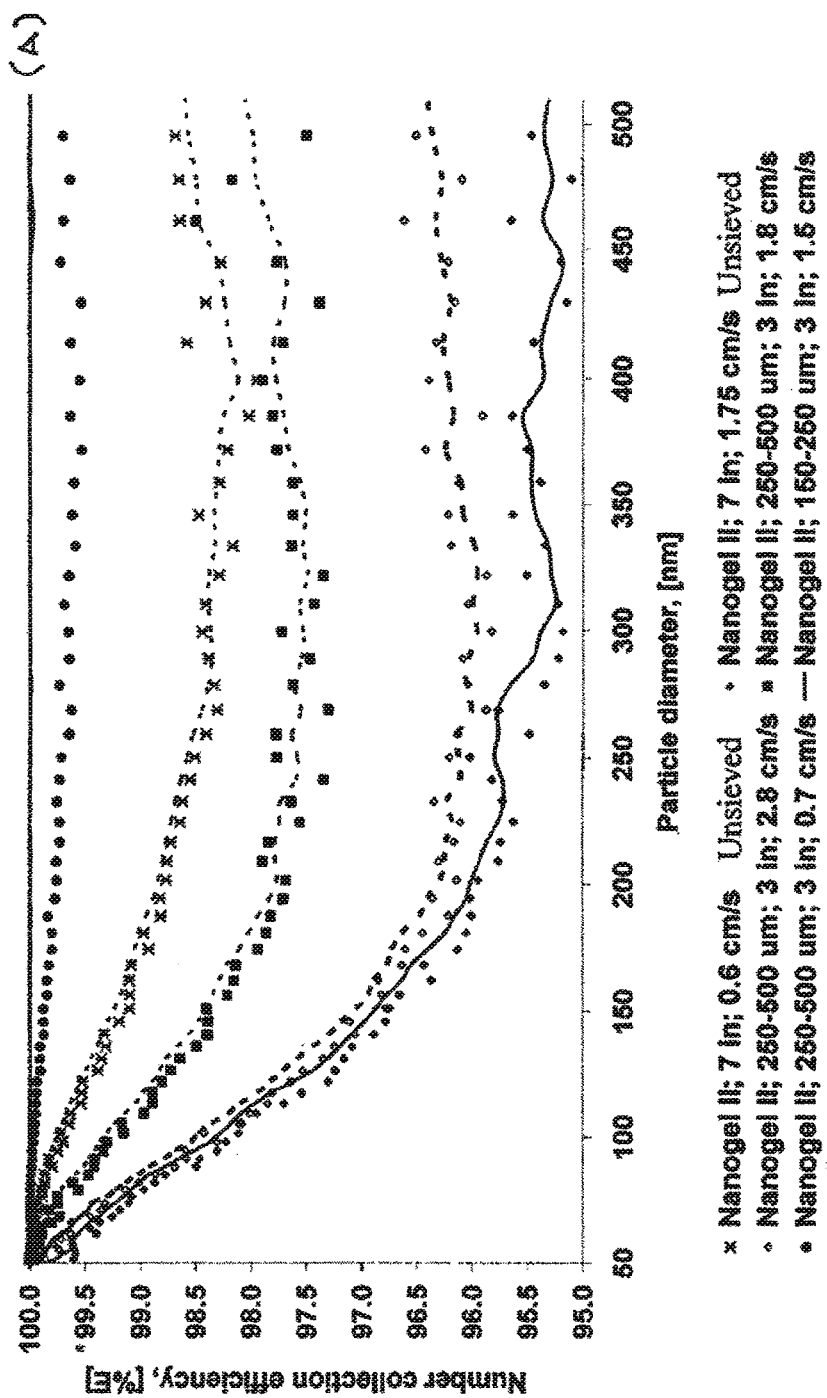
FIG. 9A is a series of plots of collection efficiency of packed beds of Nanogel® granules challenged with oil droplets.
Figure 9E:
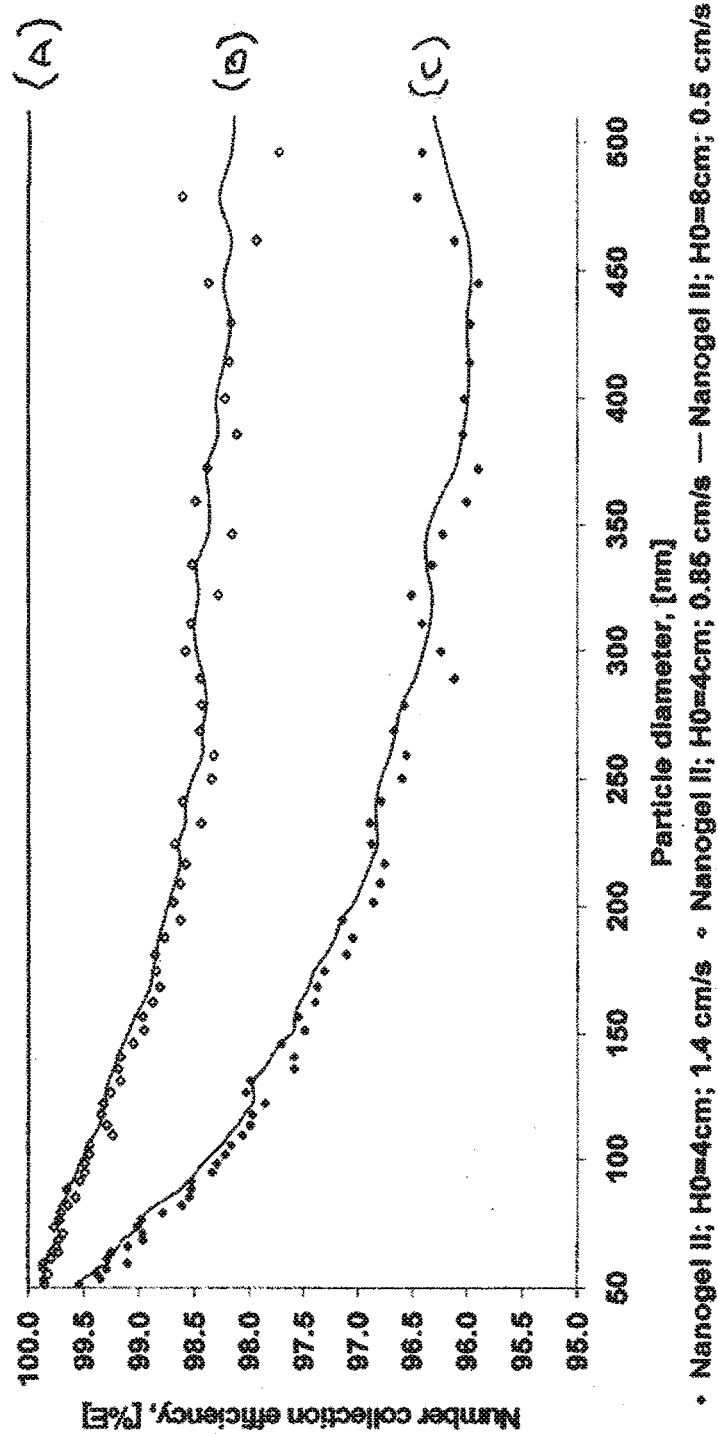
FIG. 9B is a series of plots of collection efficiency of fluidized beds of Nanogel® granules challenged with oil droplets.

Customized filters made of aerogel particles available from Cabot Corporation, Billerica, Mass. under the tradename of Nanogel®, were first challenged against submicron oil droplets. In FIG. 9A, the number collection efficiency of packed filters is plotted against the particle size of the challenging aerosol. As seen in the plot, at low at low gas velocities the collection efficiencies of packed beds of Nanogel® performed well. In particular, the packed bed of Nanogel® granules with sizes between 150-250 microns, 3 inches in depth (solid line A), showed an almost 100% collection efficiency. Two Nanogel® formulations were tested: Nanogel I corresponded to a translucent grade (TLD) and Nanogel II corresponded to an opaque grade (OGD). No significant difference between the two was observed in the air filtration experiments.

Fluidized beds of Nanogel® particles of sizes below 150 microns also were tested against oil droplets and FIG. 9B shows the collection efficiency of fluidized beds of Nanogel® granules of sizes below 150 microns. It can be seen that in the case of a homogeneously (smoothly) fluidized bed the collection efficiency is 100%, as indicated by the solid horizontal line labeled (A). For bubbling fluidized beds (fitted curves B and C) it is 98% to 96%. Thus even in cases in which fluidization of the bed was not optimal, the results were better than lower class HEPA filters.

In conclusion, Nanogel® material was found effective in removing airborne oil droplets. Nanogel® packed beds appeared to perform better than a HEPA fiber-based filter and a fluidized bed using this material removed close to 100% of oil droplets at low pressure drop indicating that the fluidized bed could be configured for continuous or very long operation periods.

With respect to bed design, baffles were found to improve efficiency at the expense of some increase in pressure drop. Due to the increase in efficiency, less filter material may be needed.

Example 2

Figure 10A:
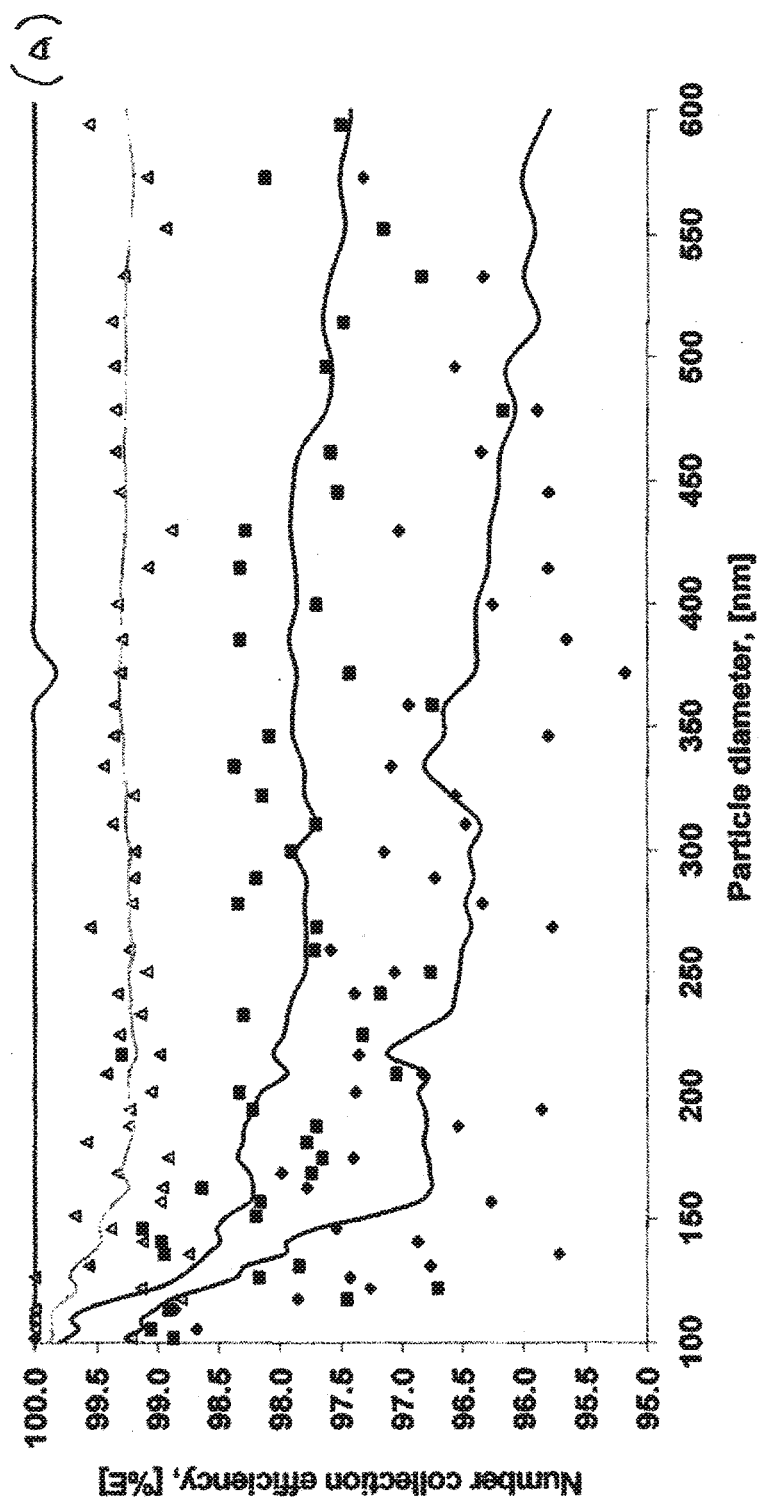
FIG. 10A is a series of plots of collection efficiency of packed beds of Nanogel® granules challenged with solid PSLS.
Figure 10E:
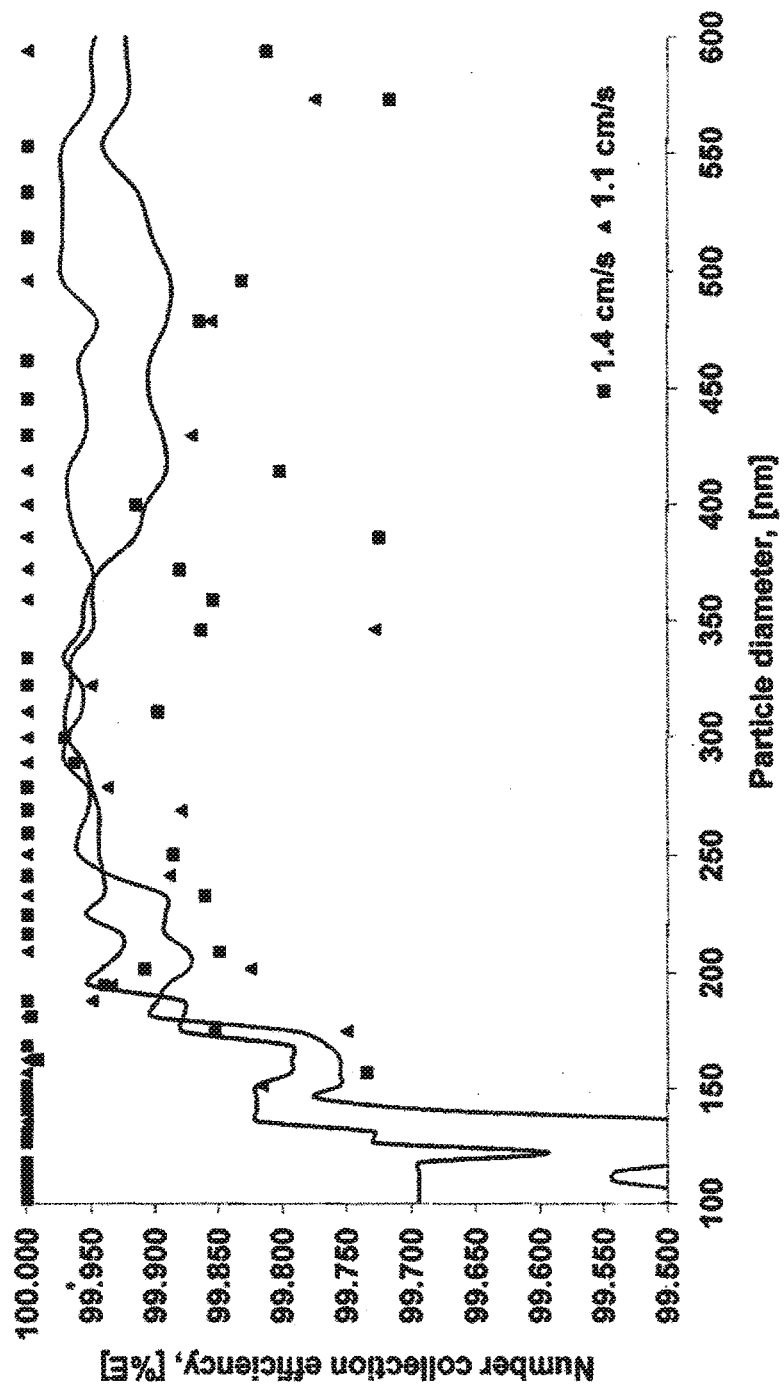
FIG. 10B is a series of plots of collection efficiency of fluidized beds with Nanogel® granules challenged with solid PSLS.

Customized filter modules also were challenged against submicron solid particles, specifically PSLS with nominal size of 0.3 microns. FIG. 10A shows the collection efficiency of packed filter modules of 3 inches in depth made of granules of different sizes as detailed in the legend of the figure. It can be seen that at low gas velocities, the customized filters showed acceptable collection efficiencies. The module containing granules in the range of 150-250 microns gives a collection efficiency of about 99.9% (solid line A), which is an improvement over HEPA filters.

Fluidized beds of Nanogel® aerogel, were challenged against submicron particles generated by atomizing PSLS with a nominal size of 0.3 microns. The collection efficiency of the fluidized beds is shown in FIG. 10B indicating that performance of the fluidized bed for capturing submicron particles was comparable to HEPA filters.

Example 3

Figure 11A:
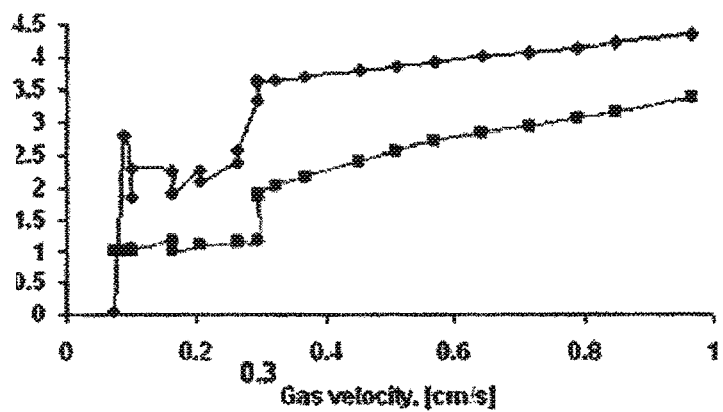
FIG. 11A is a plot of pressure drop in a fluidized bed as a function of gas velocity.
Figure 11B:
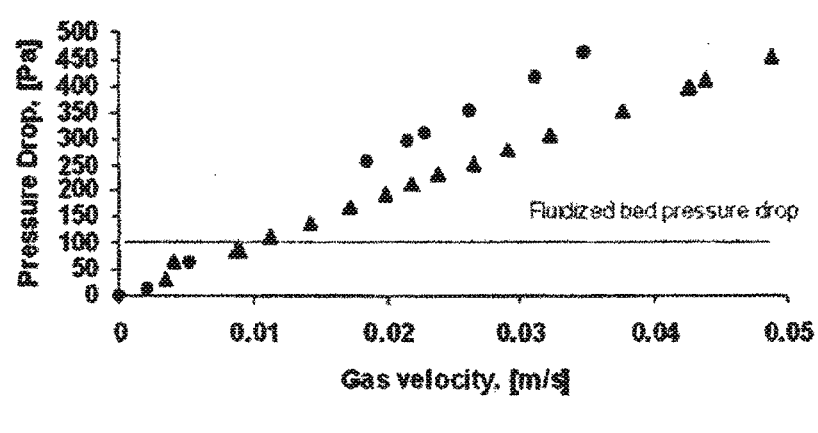
FIG. 11B is a plot comparing pressure drops of granular packed bed (filled circles) Nanogel® filter; fluidized bed Nanogel® filter (straight line); and a fiber-based HEPA filter (filled triangles).

Fluidized beds were studied with respect to fluidization characteristics and compared to packed beds. When fluidized, Nanogel® granules, 65 microns in size, show a smooth fluidization characterized by a large bed expansion (up to 3-fold initial bed height). FIG. 11A shows fluidization characteristics as described by the pressure drop and expansion of the fluidized bed. It can be seen that the minimum fluidization velocity is about 0.3 cm/s. Shown in FIG. 11B are plots of pressure drop versus gas velocity for a HEPA filter, a Nanogel® packed bed and a Nanogel® fluidized bed.

Compared to packed beds, a fluidized bed of Nanogel® as filter media has a lower pressure drop with the pressure drop remaining constant (the pressure drop plateaus and equals the weight of the particles per unit area) even though the gas velocity is increased.

Figure 12:
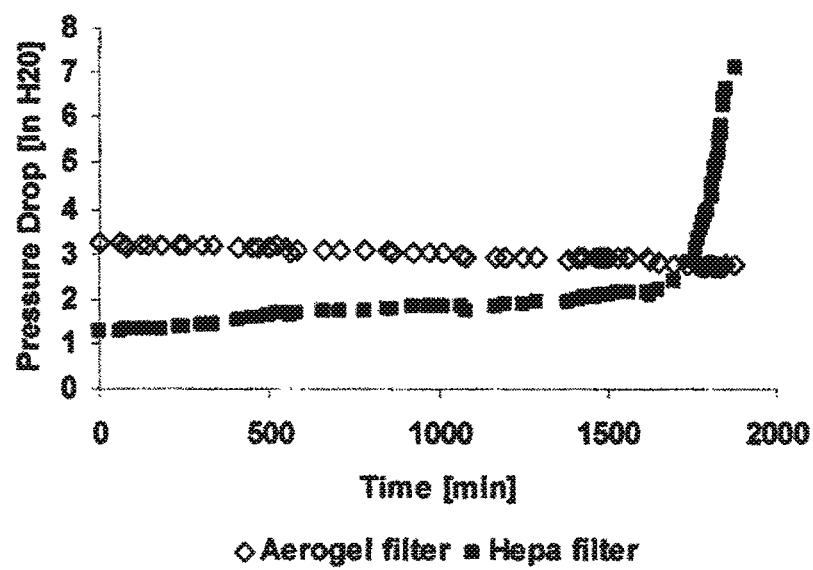
FIG. 12 is a plot showing the pressure drop of aerogel and HEPA filters with respect to time when challenged against the same oil-based aerosol.

FIG. 12 is a plot showing a comparison of the pressure drop across two filters, specifically a HEPA filter and a Nanogel® filter, with respect to time when challenged against oil-based aerosol (submicron oil droplets). Both filters were exposed simultaneously to the same aerosol concentration. Gas velocity through both filters was about 3.4 cm/s. The aerogel customized filter consisted of granules of about 150 to 250 microns and was 1 inch in thickness. Since the pressure drop across the filter determines its lifetime, it can be seen that the aerogel based filter has a longer lifetime than the HEPA filter; therefore, its oil removal capacity is expected to be much larger than that of the HEPA filter.

Example 4

Filtration results using aerogel particles were compared to results obtained using other materials such as silica, carbon black and others nanoporous materials or nanoaggregates.

Data showing filtration collection efficiencies under different operating conditions and for different types of materials are shown in the following tables. Tables 1 and 2 show results of experiments with oil-based aerosols. Tables 3 and 4 show results of experiments with solid aerosols (PSLS). The results presented in Tables 1 and 3 where obtained from experiments in which the customized filter that was a granular packed bed. The results presented in Tables 2 and 4 were obtained in experiments where the customized filter was a fluidized bed.

TABLE 1

Summary of results for packed beds against oil droplets

| Filter Media | Granule size (um) | Thick (in) | Gas velocity (cm/s) | DP Pa | % E @ 0.3 μm | Lowest % E | ASHRAE-EN1822 |
|---|---|---|---|---|---|---|---|
| Glass Beads | 180-220 | 2 | 0.6 | 80 | 99.6 | 99 | MERV 16-H11 |
| | | | 1.6 | 325 | 95.9 | 92 | MERV 15-H10 |
| | | | 2.4 | 550 | 91.1 | 85 | NONE-NONE |
| Carbon Black | 150-250 | 2 | 1.1 | 250 | 98.6 | 97 | MERV 16-H11 |
| | | | 1.7 | 400 | 94.5 | 89 | NONE-H10 |
| | | | 2.7 | 600 | 91.6 | 87 | NONE-H10 |
| | | | 3.7 | 830 | 85 | 81 | NONE-NONE |
| | 250-500 | 3 | 1.2 | 300 | 94.5 | 89 | MERV 15-H10 |
| | | | 1.8 | 400 | 88.5 | 82 | NONE-NONE |
| Nanogel II | 150-250 | 3 | 1.5 | 1500 | 100 | 99.999 | NONE-U17 |
| | 250-500 | 3 | 0.7 | 150 | 99.75 | 99.6 | MERV 16-H12 |
| Nanogel II | 250-500 | 3 | 1.8 | 250 | 97.55 | 97.4 | MERV 16-H11 |
| | | | 2.8 | 375 | 96.00 | 95.7 | NONE-H11 |
| | As received | 7 | 0.6 | 60 | 98.45 | 98 | MERV 16-H11 |
| Nanogel II | As received | 7 | 1.75 | 120 | 95.42 | 95 | MERV 15-H11 |
| TS-530 | 500-850 | 3 | 1.3 | 120 | 97.25 | 96 | MERV 16-H11 |
| | | | 2.7 | 200 | 92.00 | 90 | MERV 15-H10 |
| EH-5 | 500-850 | 3 | 1.6 | 100 | 84.00 | 81 | MERV 14-NONE |
| | | | 1.9 | 130 | 80.50 | 76 | MERV 13-NONE |
| | | | 3.9 | 230 | 76.20 | 74 | MERV 13-NONE |

TABLE 2

Summary of results for fluidized beds against oil droplets

| Filter Media | Granule size (μm) | Thick (in) | Gas velocity (cm/s) | DP Pa | % E @ 0.3 μm | Lowest % E | ASHRAE-EN1822 |
|---|---|---|---|---|---|---|---|
| Nanogel II | <150 | 6 | 0.85 | 75 | 98.50 | 98 | MERV 16-H11 |
| | | | 1.4 | 75 | 96.40 | 96 | MERV 16-H11 |
| | | 15 | 0.5 | 75 | 100 | 99.99 | MERV 16-H14 |
| TS-530 | <250 | 15 | 1.1 | 90 | 99.7 | 94 | MERV 15-H10 |
| | | | 1.4 | 90 | 99.2 | 40 | NONE-NONE |
| EH-5 | <500 | 4 | 1.8 | 1500 | 100 | 100 | MERV 16-H14 |

TABLE 3

Summary of results for packed beds against PSLS

| Filter Media | Granule size (μm) | Thick (in) | Gas velocity (cm/s) | DP Pa | % E @ 0.3 μm | Lowest % E | ASHRAE-EN1822 |
|---|---|---|---|---|---|---|---|
| Glass Beads | 180-220 | 2 | 0.7 | 160 | 99.30 | 96 | MERV 16-H11 |
| | | | 1.3 | 306 | 96.30 | 92 | MERV 15-H10 |
| Glass Beads | 180-220 | 2 | 3.4 | 750 | 87.00 | 81 | NONE-NONE |
| Regal660 A69 | 150-250 | 2 | 0.8 | 184 | 98.3 | 98 | MERV 16-H11 |
| | | | 1.5 | 360 | 98 | 97 | MERV 16-H11 |
| | | | 2.5 | 550 | 92 | 90 | MERV 15-H10 |
| | 150-250 (Baffled) | 2 | 0.8 | 440 | 99.65 | 99.3 | MERV 16-H11 |
| | | | 1.5 | 820 | 99.45 | 99 | MERV 16-H11 |
| | | | 2.4 | 1300 | 98.20 | 98 | MERV 16-H11 |
| Nanogel II | 150-250 | 3 | 2.3 | 2000 | 100 | 99.7 | MERV 16-H12 |
| | 250-500 | 3 | 1 | 120 | 99.20 | 99 | MERV 16-H11 |
| | | | 2.1 | 290 | 97.85 | 97.2 | MERV 16-H11 |
| | | | 3.4 | 460 | 96.45 | 94 | MERV 15-H11 |
| TS-530 | 500-850 | 3 | 0.6 | 40 | 99.00 | 98.5 | MERV 16-H11 |
| | | | 1.7 | 110 | 96.50 | 96 | MER 16-H11 |
| | | | 2.7 | 161 | 93.50 | 91 | MERV 15-H10 |
| EH-5 | 500-850 | 3 | 1 | 64 | 94.70 | 93 | MERV 15-H10 |
| | | | 1.5 | 100 | 88.70 | 87 | MERV 15-H10 |
| | | | 2.5 | 160 | 80.00 | 75 | MERV 14-NONE |

TABLE 4

Summary of results for fluidized beds against PSLS

| Filter Media | Granule size (μm) | Thick (in) | Gas velocity (cm/s) | DP Pa | % E @ 0.3 μm | Lowest % E | ASHRAE-EN1822 |
|---|---|---|---|---|---|---|---|
| Nanogel II (FB) | <150 | 12 | 1.1 | 75 | 99.97 | 99.7 | MERV 16-H12 |
| Nanogel II (FB) | <150 | 12 | 1.4 | 75 | 99.97 | 99.7 | MERV 16-H12 |

In the tables, TS-530 was a hydrophobic fumed silica silica obtained from Cabot Corporation, while EH-5 was a hydrophilic silica obtained from Cabot Corporation. Glass beads were obtained from Mo-Sci Corporation. Carbon Black Regal 660 A69 had granules of sizes between 150 to 250 microns and was provided by Cabot Corp. Two types of Nanogel® were provided by Cabot Corp.: a translucent grade, labeled Nanogel I, and an opaque grade, labeled Nanogel II.

Aerogel particles in a packed or fluidized bed performed well in collecting both oil droplets and solid PSLS.

While this invention has been particularly shown and described with references to preferred embodiments thereof, it will be understood by those skilled in the art that various changes in form and details may be made therein without departing from the scope of the invention encompassed by the appended claims.

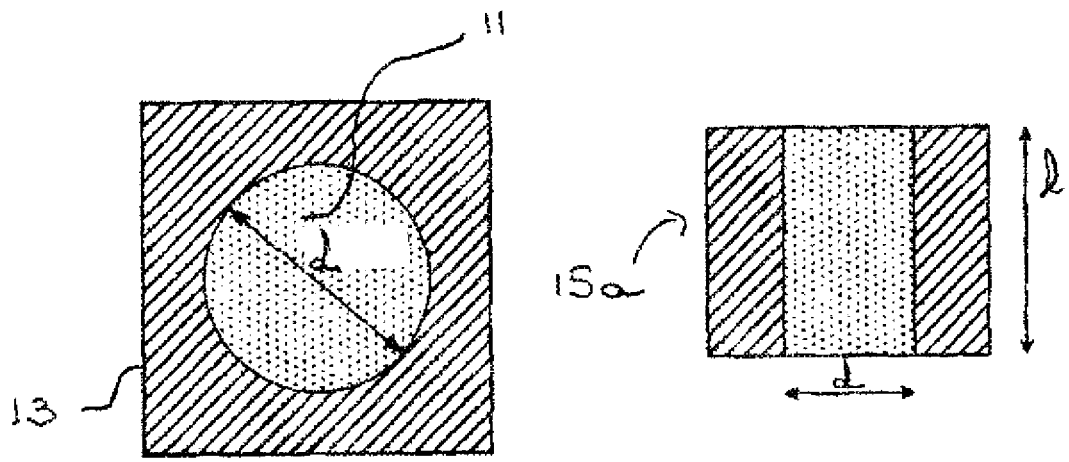

What is claimed is:

1. A purification method comprising:
   directing a system containing a gas phase component and a contaminant including liquid droplets having a droplet size of 1 micron or less through a filter which includes an aerogel material, thereby removing at least a portion of the contaminant, wherein said liquid droplets are removed with a collection efficiency, % E, of at least 95%, wherein the filter is a fluidized bed device.

2. The method of claim 1, wherein the system is a gas stream.

3. The method of claim 1, wherein the gas phase component is selected from the group consisting of air, nitrogen, noble gas, carbon monoxide, carbon dioxide and any combination thereof.

4. The method of claim 1, wherein the contaminant further includes solid particles.

5. The method of claim 1, wherein the liquid droplets are oil droplets.

6. The method of claim 1, wherein the liquid droplets are an aerosol.

7. The method of claim 1, wherein the contaminant further includes droplets having a droplet size that is greater than one micron.

8. The method of claim 1, wherein the liquid droplets have a droplet size of at least 0.05 microns.

9. The method of claim 1, wherein the contaminant has a most penetrating particle size.

10. The method of claim 1, wherein the droplets include an organic material, an oil, a biological material or any combination thereof.

11. The method of claim 1, wherein the aerogel material is in particulate form.

12. The method of claim 1, wherein the aerogel material is a silica aerogel material.

13. The method of claim 1, wherein the aerogel material is hydrophobic.

14. The method of claim 1, wherein the aerogel material has a particle size within the range of 65 microns to 150 microns.

15. The method of claim 1, wherein the aerogel material has a particle size between 150 microns and 250 microns.

16. The method of claim 1, wherein the filter is operated in a batch or a continuous mode.

* * * * *

UNITED STATES PATENT AND TRADEMARK OFFICE
CERTIFICATE OF CORRECTION

Page 1 of 2

PATENT NO. : 8,632,623 B2
APPLICATION NO. : 12/434306
DATED : January 21, 2014
INVENTOR(S) : Pfeffer et al.

It is certified that error appears in the above-identified patent and that said Letters Patent is hereby corrected as shown below:

On the Title Page

Please delete item (12) "Pferrer et al." and insert item (12) --Pfeffer-- as shown on the attached page Item (75) please delete "Robert Pferrer, Scottsdale AZ (US)" and insert Item (75) --Robert Pfeffer, Scottsdale AZ (US)-- as shown on the attached page Signed and Sealed this
Twenty-eighth Day of October, 2014

Michelle K. Lee
*Deputy Director of the United States Patent and Trademark Office*

(12) United States Patent
Pfeffer et al.

(10) Patent No.: US 8,632,623 B2
(45) Date of Patent: Jan. 21, 2014

(54) AEROGEL-BASED FILTRATION OF GAS PHASE SYSTEMS

(75) Inventors: Robert Pfeffer, Scottsdale, AZ (US); Jose A. Quevedo, Brick, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 561 days.

(21) Appl. No.: 12/434,306

(22) Filed: May 1, 2009

(65) Prior Publication Data
US 2010/0071554 A1 Mar. 25, 2010

Related U.S. Application Data

(63) Continuation of application No. PCT/US2007/083177, filed on Oct. 31, 2007.

(60) Provisional application No. 60/863,866, filed on Nov. 1, 2006.

(51) Int. Cl.
*B01D 53/12* (2006.01)

(52) U.S. Cl.
USPC ............... 95/108; 95/275; 96/150; 55/474

(58) Field of Classification Search
USPC ............ 422/120, 139–149; 73/864–864.74, 73/273–287; 55/522–528, 474; 95/273–287, 107–113, 200, 230, 95/900–903; 420/120; 96/108–154, 96/290–300
See application file for complete search history.

(56) References Cited

U.S. PATENT DOCUMENTS

| | | | |
|---|---|---|---|
| 4,911,775 A * | 3/1990 | Kuma et al. | 156/208 |
| 5,360,572 A | 11/1994 | Hotaling et al. | |
| 5,470,612 A * | 11/1995 | Hotaling et al. | 427/377 |
| 5,786,059 A | 7/1998 | Frank et al. | |
| 5,789,075 A | 8/1998 | Frank et al. | |
| 6,101,886 A * | 8/2000 | Brenizer et al. | 73/863.23 |
| 6,447,991 B1 * | 9/2002 | Daitch et al. | 435/5 |
| 6,709,600 B2 | 3/2004 | Hrubesh et al. | |
| 6,860,924 B2 * | 3/2005 | Rajagopalan et al. | 96/154 |
| 6,887,563 B2 | 5/2005 | Frank et al. | |

(Continued)

FOREIGN PATENT DOCUMENTS

| | | |
|---|---|---|
| EP | 1452228 A1 | 9/2004 |
| WO | 2005/022667 A2 | 3/2005 |
| WO | 2006/119301 A2 | 11/2006 |
| WO | 2007047970 A2 | 4/2007 |

OTHER PUBLICATIONS

International Search Report and Written Opinion of the International Searching Authority mailed Mar. 3, 2008, from counterpart International Application PCT/US2007/083177, filed on Oct. 31, 2007.

(Continued)

*Primary Examiner* — Duane Smith
*Assistant Examiner* — Thomas McKenzie

(57) ABSTRACT

A purification method comprises directing a system having a gas phase component and a contaminant through a filter including an aerogel material, e.g., hydrophobic silica-based aerogel particles. A filter for purifying a gas phase system comprises an aerogel material in an amount sufficient to remove at least a portion of a contaminant present in the gas phase system. In preferred examples, the filter is a fluidized bed. In further examples, the filter is a packed bed.

16 Claims, 15 Drawing Sheets